United States Patent [19]
Lin et al.

[11] Patent Number: 5,681,617
[45] Date of Patent: Oct. 28, 1997

[54] LARGE SCALE METAL COATING OF CONTINUOUS CERAMIC FIBERS

[75] Inventors: Ray Y. Lin; Sunil G. Warrier, both of Cincinnati, Ohio

[73] Assignee: University of Cincinnati, Cincinnati, Ohio

[21] Appl. No.: 280,300

[22] Filed: Jul. 26, 1994

Related U.S. Application Data

[63] Continuation-in-part of Ser. No. 130,588, Oct. 1, 1993, abandoned.

[51] Int. Cl.$^6$ ............................................. B32B 5/06
[52] U.S. Cl. .................... 427/299; 427/304; 427/305; 427/434.5; 427/434.6; 427/443.1; 427/443.2
[58] Field of Search .................................. 427/299, 304, 427/305, 434.5, 434.6, 443.1, 443.2

[56] References Cited

U.S. PATENT DOCUMENTS

| | | | |
|---|---|---|---|
| 2,267,597 | 12/1941 | Neville et al. | 91/46 |
| 3,238,059 | 3/1966 | Stobierski | 117/102 |
| 3,843,386 | 10/1974 | Ribbons, III | 427/434.5 |
| 4,361,605 | 11/1982 | Takahashi et al. | 427/424 |
| 4,431,688 | 2/1984 | Kornmann | 427/310 |
| 4,732,779 | 3/1988 | Towata et al. | 427/434.5 |
| 4,746,541 | 5/1988 | Marikar et al. | 427/126.1 |
| 5,073,412 | 12/1991 | Gaier | 427/443.2 |
| 5,108,797 | 4/1992 | Unger | 427/389.8 |
| 5,133,282 | 7/1992 | Bates et al. | 118/420 |
| 5,151,306 | 9/1992 | Andrews et al. | 427/434.5 |
| 5,527,410 | 6/1996 | Taniguchi et al. | 156/158 |

*Primary Examiner*—Benjamin Utech
*Attorney, Agent, or Firm*—Frost & Jacobs

[57] ABSTRACT

The present invention provides a method for application of metal coatings, specifically copper and silver, to continuous ceramic fibers, by electroless deposition. The method comprises the steps of: winding the uncoated ceramic fibers over a frame so that the fibers are coiled adjacent to each other; introducing the wound ceramic fibers into a solution of metal with which the fibers are to be coated; circulating the solution through said fibers; and contacting and causing the metal to be deposited on the wound fibers. Coated continuous ceramic fibers produced by the method of the present invention are also included within the scope of this invention.

12 Claims, 5 Drawing Sheets

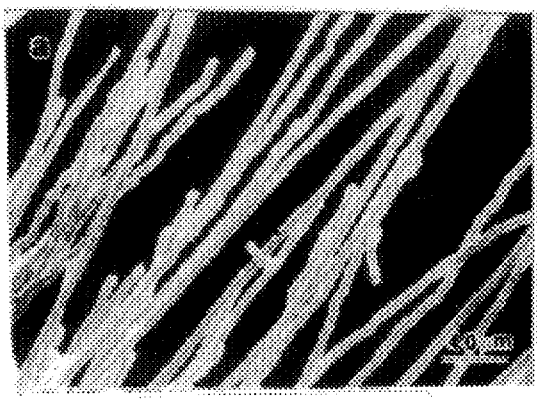
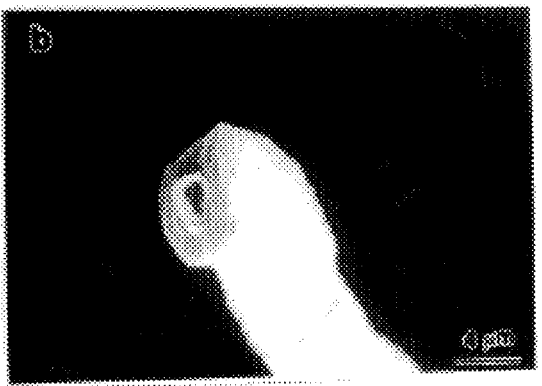
Figure 2 A
Figure 2 B
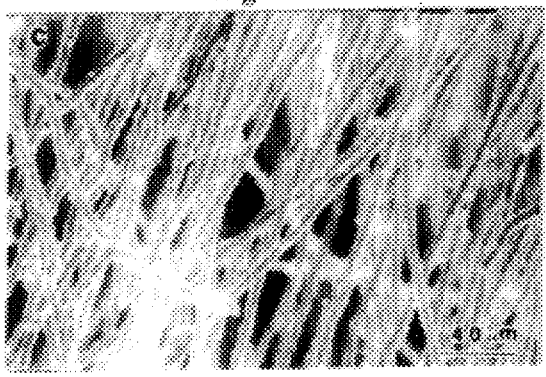
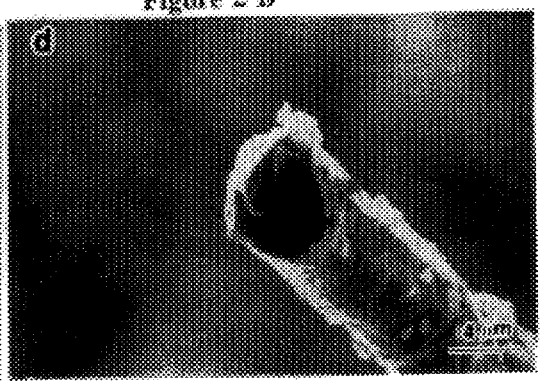
Figure 2 C
Figure 2 D
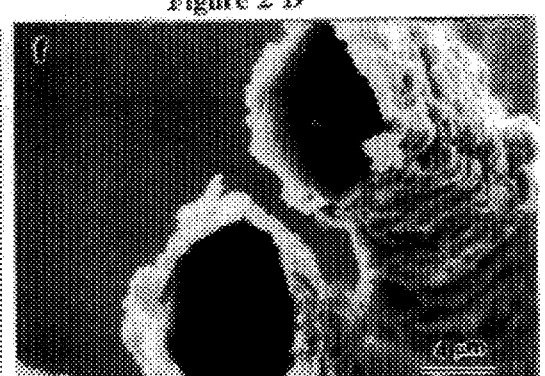
Figure 2 E
Figure 2 F
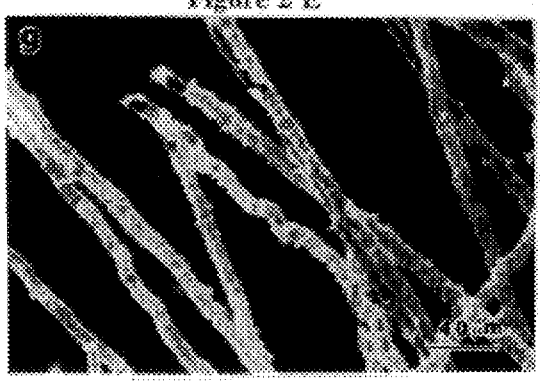
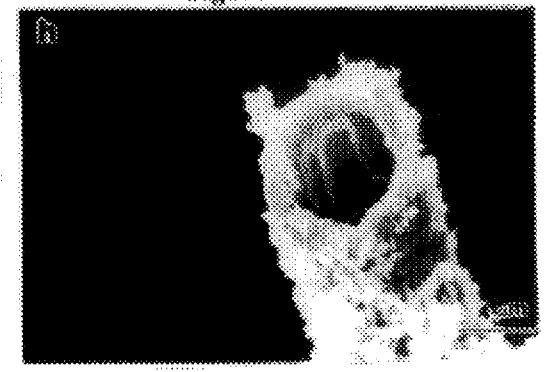
Figure 2 G
Figure 2 H

LARGE SCALE METAL COATING OF CONTINUOUS CERAMIC FIBERS

This is a continuation-in-part application of U.S. patent application Ser. No. 08/130,588, filed on Oct. 1, 1993 now abandoned.

The present invention provides a method for application of metal coatings to continuous ceramic fibers by electroless deposition. More specifically, this invention provides a method for the deposition of copper and silver coatings, by an electroless method, onto continuous ceramic fibers. Coated continuous ceramic fibers produced by the method of the present invention are also included within the scope of this invention.

BACKGROUND OF THE INVENTION

Metal coated ceramic fibers have been used for over two decades to improve the wetting characteristics between fibers and molten matrices. Coatings of metals like copper, silver and nickel have been deposited on continuous ceramic fibers by many researchers using methods such as electroplating, electroless deposition, chemical vapor deposition, physical vapor deposition and the like. The term "continuous fibers" as used herein refers to fibers of a fixed length, each of which is unbroken and therefore continuous.

Electroless deposition has advantages such as a more uniform coating of the exposed surface, a more uniform coating thickness and a reduction in manufacturing costs as compared to other processes. However, thus far, electroless deposition of metals on bundles of fibers has been unsuccessful because it is difficult to obtain a uniform coating on the surfaces of the inner fibers in the bundle sought to be coated.

The method of the present invention is a technique for coating bundles of continuous fibers. The ceramic fibers to be coated are first wound over a substantially rectangular frame in such a manner that the fibers are coiled adjacent to each other. The fiber assembly is then introduced into a glass container and solutions containing ions of metals are circulated using a circulation pump. The circulation of the metal solutions through the fiber bundles improves the uniformity of the coating on the inner fibers in the bundle and also causes a more uniform overall deposition, as compared to prior art electroless deposition methods.

U.S. Pat. No. 2,267,597 to Neville et al. discloses a method and apparatus for making artificial bristles. Neville's coating method includes winding fibers onto a rectangular frame and introducing the wound fibers into a coating solution. Neville discloses a physical coating process, wherein the frame is used to withdraw the fibers from a coating solution of a given viscosity at a uniform rate to control fiber thickness. Neville's physical coating process requires no circulation of the coating solution. Coating solutions disclosed by Neville must be viscous enough to adhere to the surface of the material to be coated, a characteristic incompatible with circulating the coating fluid. Therefore, Neville's process teaches away from the process of the present invention.

U.S. Pat. No. 3,238,059 to Stobierski discloses a method and apparatus for applying a thin copper coating to a ferrous wire. The method includes continuously passing a length of wire through a suitable metallic salt solution for a length of time sufficient to achieve the desired coating. The wire is then passed through a rinse tank and then to a final collection point. Simultaneously with the passage of wire through the salt solution, new salt solution is continuously being mixed in the proper proportions and fed to the solution tank.

U.S. Pat. No. 4,361,605 to Tokohashi et al. discloses a method for surface treating articles including the steps of moving said articles through a liquid in a dipping tank from the first end of the tank to a second end of the tank, collecting sludge in at least two hoppers comprising the entire bottom of the dipping tank, draining the sludge in a drain path, separating the liquid and solid of the sludge in a liquid solid separator connected in said drain path and circulating all of the separated liquid directly though a conduit means connected only between all of the hoppers and a first spray tool at the second end of the dipping tank for rinsing the sludge from the articles.

U.S. Pat. No. 4,431,688 to Kornmann discloses a process for the dip-coating of filament-like articles by upwardly passing the article into a bath of molten metal through the bottom and top vertical opening of a spout containing the molten metal, the article to be coated is wrapped, before it enters the bottom inlet opening in the spout, with a blanket of protective gas at a sufficient pressure to cause the gas to penetrate into the spout simultaneously with the article, to progressively and regularly circulate around the molten metal and to steadily emerge from the upper opening of the spout still effectively shielding the freshly coated article.

U.S. Pat. No. 4,746,541 to Marikar et al. discloses a process for preparing electrically fibrous material from a thermally stabilized acrylic fibrous material. Marikar teaches contacting a fibrous material with a cuprous ion-containing solution by immersion, spraying, drip feeding or padding to impregnate the fibrous material with cuprous ions. Following a sulfiding treatment, the fibrous material has a covellite (CuS) coating. Marikar does not teach metal coating and does not suggest circulating the coating solution for a more uniform coating, since uniformity is not required for the electrically conductive fibrous material of Marikar.

U.S. Pat. No. 5,108,797 to Unger discloses a method for impregnating fiber bundles with molten or liquid resin in manufacturing a fiber-reinforced material wherein each fiber is surrounded by matrix resin, by impregnating a continuous web of one or more fiber bundles with molten or liquid resin and solidifying the resin by cooling or chemical reaction. Before the impregnation, the molten or liquid resin material is made subject to shear forces by bringing it to flow between two surfaces near each other, which are in moving relationship to each other.

U.S. Pat. No. 5,151,306 to Andrews et al. discloses a method of coating elongated strand material with a marking material by circulating a liquid coating material through an input section and an inner chamber of housing and outwardly through a output section to be returned to a reservoir. Elongated strand material is then advanced through an entry position into and through the inner chamber wherein it is contracted by being circulated therethrough. Afterwards, each successive increment of length is advanced through an exit die which causes the liquid coating material to be formed into a layer of predetermined thickness on the elongated strand material.

The article "Chemical Silver Plating On Carbon Fibers" by Cheng et al., teaches a process for coating carbon fibers with copper and silver. While Cheng provides a teaching of etching, sensitization and activation of the surfaces of the fibers, there is no suggestion or motivation in Cheng to circulate the metal solutions to obtain uniform coating on the inner fiber surfaces.

The article "Silver Coating On Carbon and SiC Fibers" by Warrier and Lin, is a study regarding the coating of fibers with copper and silver. The article demonstrates that the rate of silver coating depends on the degree of graphitization of carbon fibers. There is no suggestion, motivation or teaching of the desirability of circulating the metal solutions for more uniform coating on the inner fiber surfaces.

SUMMARY OF THE INVENTION

It is a primary object of the present invention to provide an electroless deposition method for uniformly coating the surfaces of ceramic fibers with metal.

It is a further object of the present invention to provide a method for more uniformly coating the inner fibers of a fiber bundle with metal.

It is another object of the present invention to provide a method for coating ceramic fibers with multiple layers of a plurality of metals.

In accordance with the present invention there is provided a method for application of metal coatings to continuous ceramic fibers, by electroless deposition, the method comprising the steps of: winding the uncoated ceramic fibers over a frame so that said fibers are coiled adjacent to each other; introducing said wound ceramic fibers into a solution of a first metal with which said fibers are to be coated; circulating said solution through said fibers; and contacting and causing said first metal to be deposited on said wound fibers.

BRIEF DESCRIPTION OF THE DRAWINGS

FIG. 2 shows the morphology of CVD carbon fibers: (a,b) fibers prior to coating, (c,d) fibers coated with copper for 10 minutes by method of the present invention, (e,f) fibers coated with silver for 15 minutes by method of the present invention and (g,h) fibers coated with silver for 15 minutes by method of the present invention.

DETAILED DESCRIPTION OF THE INVENTION

The invention will now be described by way of preferred embodiments of the method of the present invention for the application of metal coatings to continuous ceramic fibers, by electroless deposition.

Figure 1:
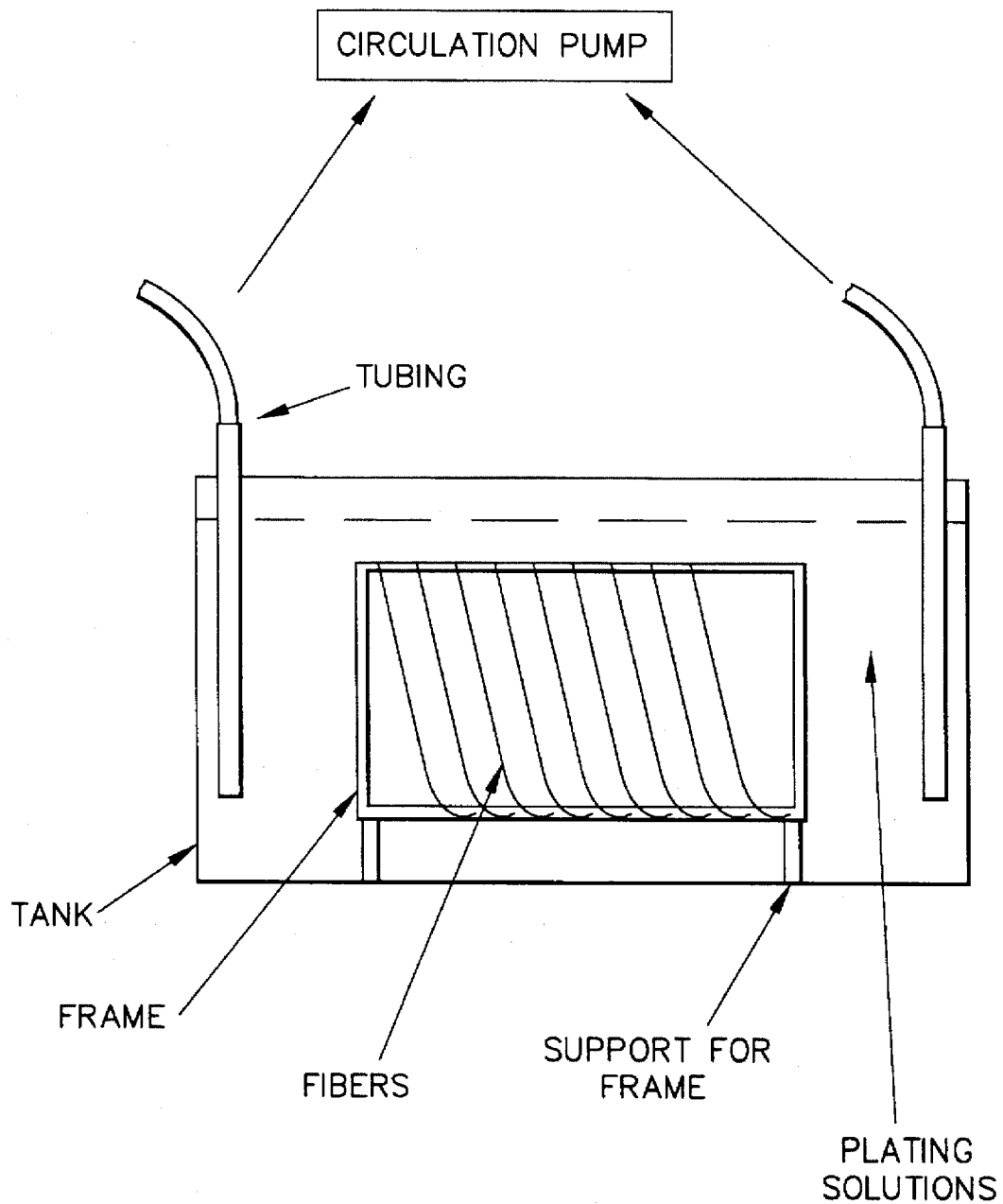
FIG. 1 is a schematic representation of a preferred apparatus used to practice the method of the present invention.

Continuous ceramic fibers that are to be coated often have organic or polymeric sizing and surface impurities that negatively affect the application of a metal coating. Rinsing the fibers with a solution of acetone, ethanol or methanol removes sizing and impurities, thereby providing a better surface for coating. After this treatment, continuous ceramic fibers that are to be coated are wound over a substantially rectangular frame in such a way that the fiber bundles (each bundle may contain thousands of fibers, 10–15 μm in diameter) are coiled adjacent to each other as shown in FIG. 1. The frame and the fibers are then introduced into a glass container and different solutions are circulated through the fibers using a circulation pump. Initially, the fibers are etched by circulating a solution of nitric acid, sulfuric acid or hydrochloric acid. Solutions of stannous chloride and palladium chloride, circulated prior to the introduction of a solution of a metal with which the fibers are to be coated, increase adhesion between the metal and the fibers, although the metal will coat the fibers without treatment with these chloride solutions. Circulation of the stannous chloride solution sensitizes the fiber surfaces. Circulation of the palladium chloride solution, following the stannous chloride solution, activates the fiber surfaces.

The concentration of metal ions in the metal solution must be such that metal can be deposited on the fibers. Preferably, for an aqueous copper sulfate solution this range is from about 0.5 to about 5 weight percent $CuSO_4$ and for an aqueous silver nitrate solution this range is from about 1 to about 15 weight percent $AgNO_3$, to provide adequate metal ions. The metal solution also contains a reducing agent and a pH regulating agent. The reducing agent is selected from the group consisting of formaldehyde, hydrazine, borohydride, sodium potassium tartarrate, ethanol and hypophosphite. The pH regulating agent is selected from the group consisting of sodium hydroxide, potassium hydroxide, ammonium hydroxide, sulfuric acid, acetic acid and sodium potassium tartarate. A second metal may be deposited over the first metal so long as the second metal is lower in the electromotive series than the first metal. The circulation of the etching, chloride and metal solutions through the fiber bundles allows these solutions to come in contact with all the fiber surfaces in the bundle, including the inner fibers, and improves coating uniformity. Also, the circulating solutions prevent any segregation effects (maintain a homogeneous solution) and improve the overall coating efficiency.

Using the process described above, carbon and silicon carbide (SIC) fibers were successfully coated with copper and silver. The tensile strength and modulus of elasticity of single fibers, both before and after coating by method of the present invention were determined. Polyacrylonitrile (PAN) base carbon fibers had an as-received strength and modulus of 2.4 GPa and 197 MPa, respectively. After coating, these values were 2.4 GPa and 193 MPa, respectively. Nicalon SiC fibers had an as-received strength and modulus of 2.2 GPa and 146 MPa, respectively. After coating, these values were 2.5 GPa and 145 MPa, respectively. The above results indicate that the coating procedure did not degrade the fibers.

EXAMPLE 1

Copper and Silver Coating on Chemical Vapor Deposition (CVD) Carbon Fibers

CVD carbon fibers from Applied Sciences Inc. were wound on a rectangular frame and immersed in a glass container as shown in FIG. 1. The fibers were first rinsed with distilled water and then with acetone to remove the organic sizing on the fibers. A series of solutions, in the order described below, were introduced into the container, the solutions being circulated by a circulation pump. The fiber surfaces were first activated by a solution of stannous chloride followed by a solution of palladium chloride. Copper was then deposited on the activated fibers from an aqueous copper sulfate solution. The copper sulfate solution used herein consisted of (by weight percent): 1% $CuSO_4$, 2.5% KNaC$_4$H$_4$O$_6$.4H$_2$O (sodium potassium tartarate), 0.5% HCHO (formaldehyde) and rest water. If silver coating is desired in addition to the copper, a silver nitrate solution is circulated next to coat the copper-coated fibers. The silver nitrate solution used herein consisted of (by weight percent): 5.77% AgNO$_3$, 3.85% sodium hydroxide, 0.083% NH$_4$OH (ammonium hydroxide) and rest water. Distilled water was used after the final coating process as well as in between each step to clean the fibers. Fibers prior to and after coating by this process are shown in FIG. 2.

EXAMPLE 2

Copper and Silver Coating on P-55 Graphite Fibers

Figure 3:
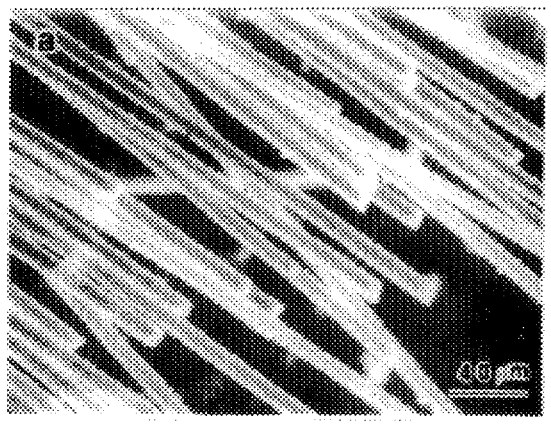
FIG. 3 shows the morphology of P-55 pitch base graphite fibers: (a,b) fibers prior to coating, (c,d) fibers coated with copper for 10 minutes by method of the present invention and (e,f) fibers coated with silver for 15 minutes by method of the present invention.
Figure 3:
Figure 3:
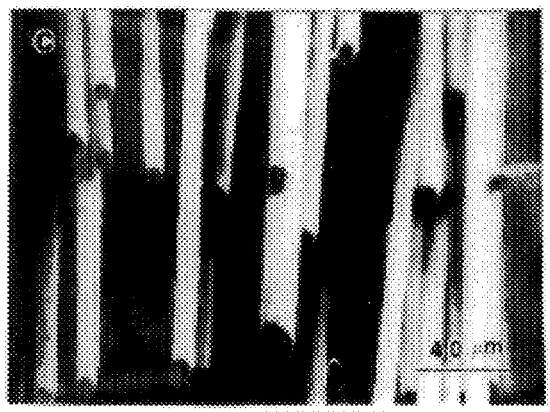
Figure 3:
Figure 3:
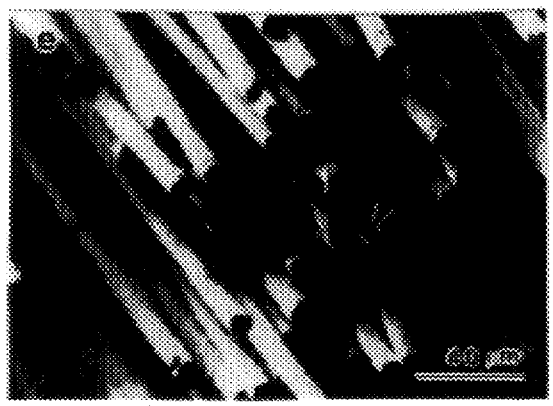
Figure 3:

Continuous P-55 pitch base graphite fibers from Union Carbide were wound on a frame and coated with copper and silver in a manner similar to that described in Example 1. FIG. 3 shows pitch base P-55 graphite fibers prior to and after coating by this procedure. The solutions utilized were identical to those in Example 1.

EXAMPLE 3

Copper and Silver Coating on PAN Base Carbon Fibers

Figure 4:
FIG. 4 shows the morphology of PAN base carbon fibers: (a,b) fibers prior to coating, (c,d) fibers coated with copper for 10 minutes by method of the present invention and (e,f) fibers coated with silver for 15 minutes by method of the present invention.
Figure 4:
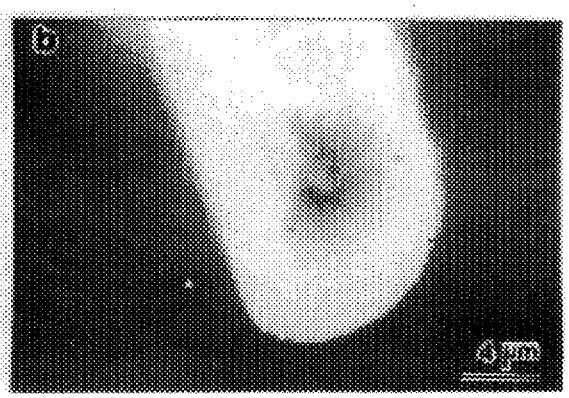
Figure 4:
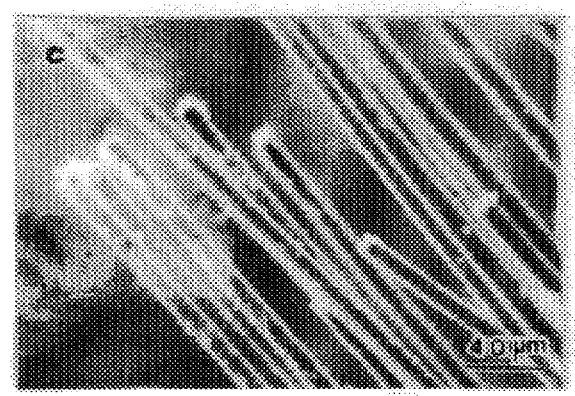
Figure 4:
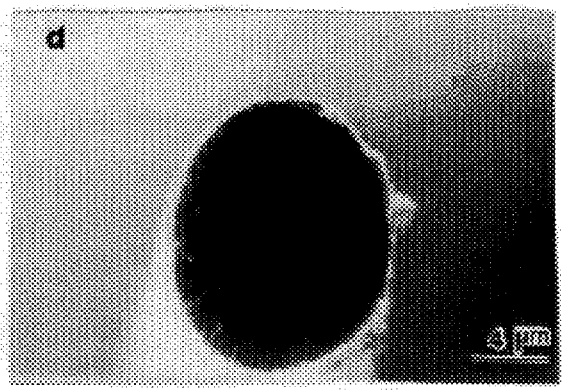
Figure 4:
Figure 4:
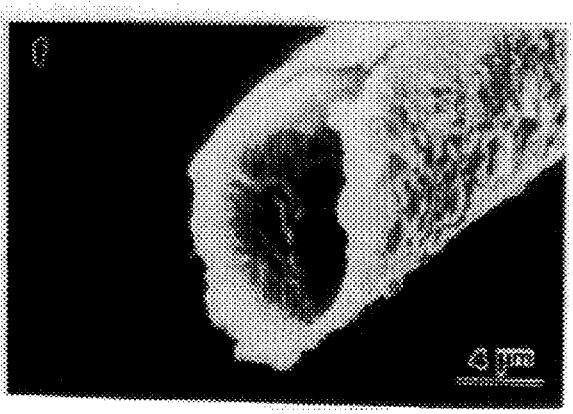

Continuous PAN base carbon fibers from Hercules Inc., were coated with copper and silver in an identical manner as described in the earlier section. FIG. 4 show fibers prior to and after coating with copper and silver by method of the present invention. The solutions utilized were identical to those in Example 1.

EXAMPLE 4

Silver Coating on SiC Fibers

Figure 5:
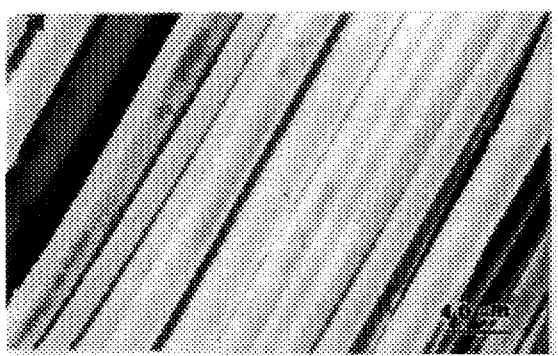
FIG. 5 shows the morphology of Nicalon SiC fibers: (a,b) fibers prior to coating and (c,d) fibers coated with silver for 15 minutes by method of the present invention.
Figure 5:
Figure 5:
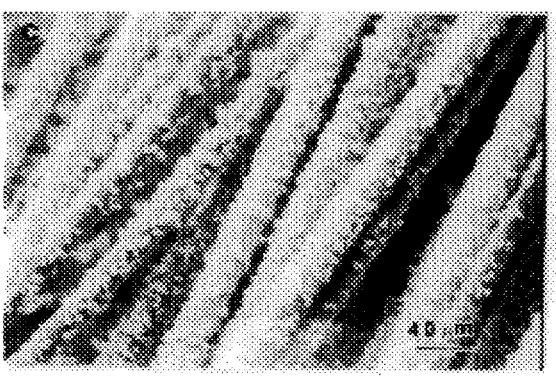
Figure 5:
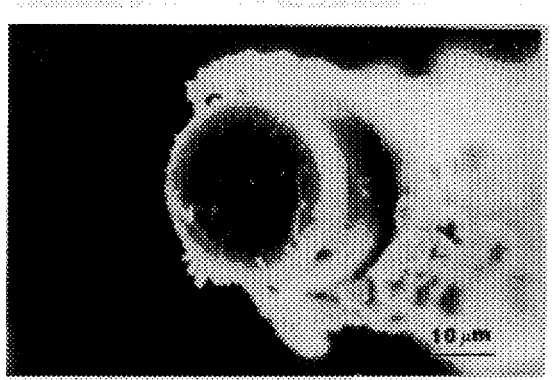

Continuous Nicalon SiC fibers marketed by Dow Corning were also coated in an identical manner as described earlier. FIG. 5 shows fibers, as-received and after coating with silver by the method of the present invention for 15 minutes. The solutions utilized were identical to those in Example 1.

Thus, it is apparent that there has been provided, in accordance with the present invention, a method for the application of metal coatings to continuous ceramic fibers, by electroless deposition, which fully satisfies the object and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations which fall within the spirit and broad scope of the appended claims.

We claim:

1. A method for application of metal coatings to continuous ceramic fibers, by electroless deposition, the method comprising the steps of:

winding the uncoated ceramic fibers over a frame so that said fibers are coiled adjacent to each other;

introducing said wound ceramic fibers into a solution of a first metal with which said fibers are to be coated;

circulating said solution through said fibers; and contacting and causing said first metal to be deposited on said wound fibers.

2. The method of claim 1, further comprising the steps of:

circulating a solution of a second metal through said fibers after deposit of said first metal on said fibers; and contacting and causing said second metal to be deposited on said wound fibers.

3. The method of claim 2, wherein said second solution is an aqueous solution containing ions of the metal with which said fibers are to be coated.

4. The method of claim 1, comprising the additional steps, prior to said winding, of:

rinsing said ceramic fibers with a solution selected from the group consisting of acetone, ethanol and methanol;

etching the surfaces of said fibers with a solution selected from the group consisting of nitric acid, sulfuric acid and hydrochloric acid;

sensitizing the surfaces of said fibers with a solution of stannous chloride; and activating the surfaces of said fibers with a solution of palladium chloride.

5. The method of claim 1, wherein said solution is an aqueous solution containing ions of the metal with which said fibers are to be coated.

6. The method of claim 1, wherein said frame is substantially rectangular.

7. The method of claim 1, wherein said fibers are selected from the group consisting of carbon fibers, including graphite, silicon carbide fibers and alumina fibers and said solutions are selected from the group consisting of aqueous solutions of copper sulfate and aqueous solutions of silver nitrate.

8. The method of claim 7, wherein said copper sulfate solution comprises from about 0.5 to about 5 weight percent CuSO$_4$ and wherein said silver nitrate solution comprises from about 1 to about 15 weight percent AgNO$_3$.

9. The method of claim 8, wherein said copper sulfate solution further comprises a reducing agent selected from the group consisting of formaldehyde, hydrazine, borohydride, sodium potassium tartarate and hypophosphite and a pH regulating agent selected from the group consisting of sodium hydroxide, potassium hydroxide, ammonium hydroxide, sulfuric acid and acetic acid.

10. The method of claim 8, wherein said silver nitrate solution further comprises a reducing agent selected from the group consisting of ethanol, hydrazine, borohydride and hypophosphite, and a pH regulating agent selected from the group consisting of sodium hydroxide, ammonium hydroxide, potassium hydroxide, sulfuric acid and acetic acid.

11. The method of claim 1, wherein the tensile strength and modulus of elasticity of said fibers are not degraded by said deposition of said metal.

12. The method of claim 2, wherein said second metal is below said first metal in the electromotive series.

* * * * *